Nov. 29, 1955       W. F. HOLIN       2,725,124
BRAKE RIGGING
Filed July 30, 1954                3 Sheets-Sheet 1

Inventor
William F. Holin
By
L. C. Thorpe
Attorney

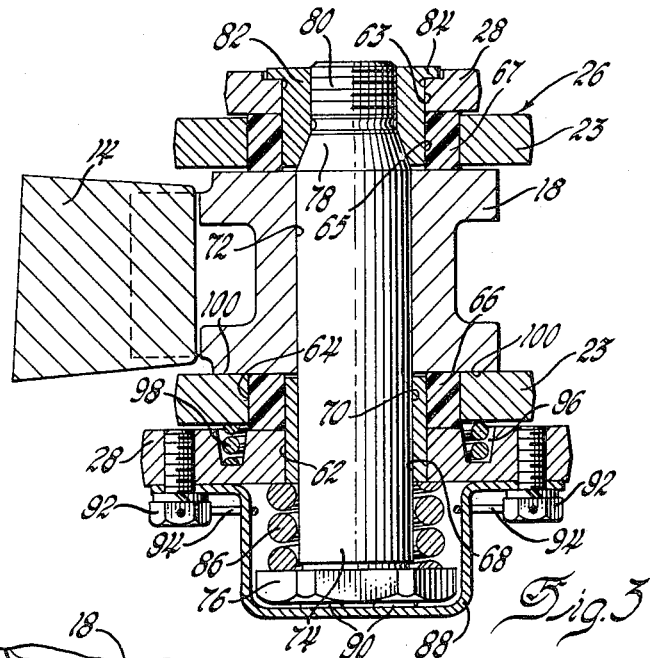
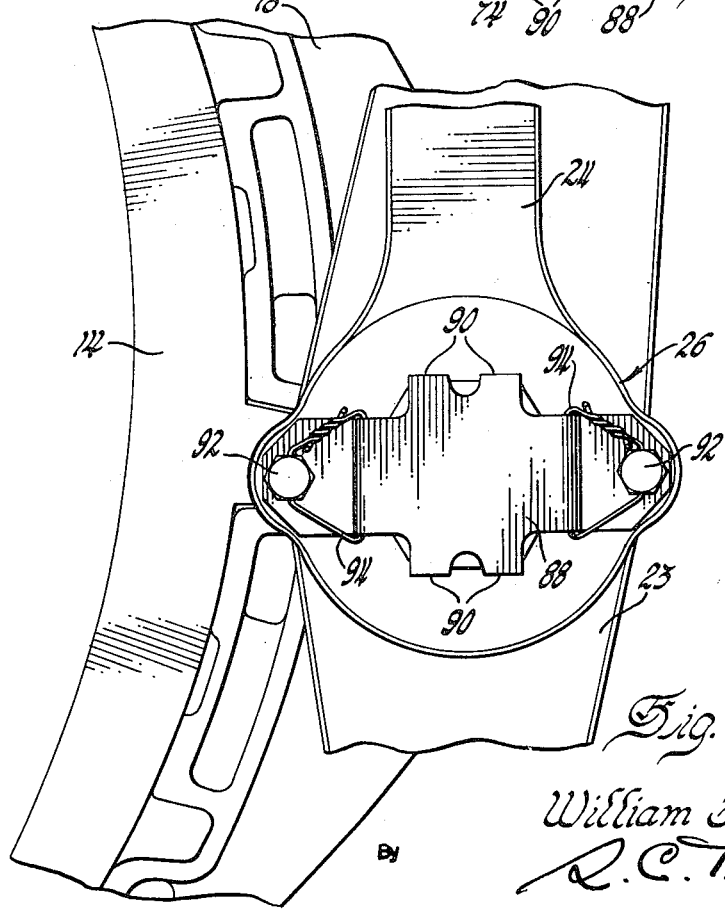

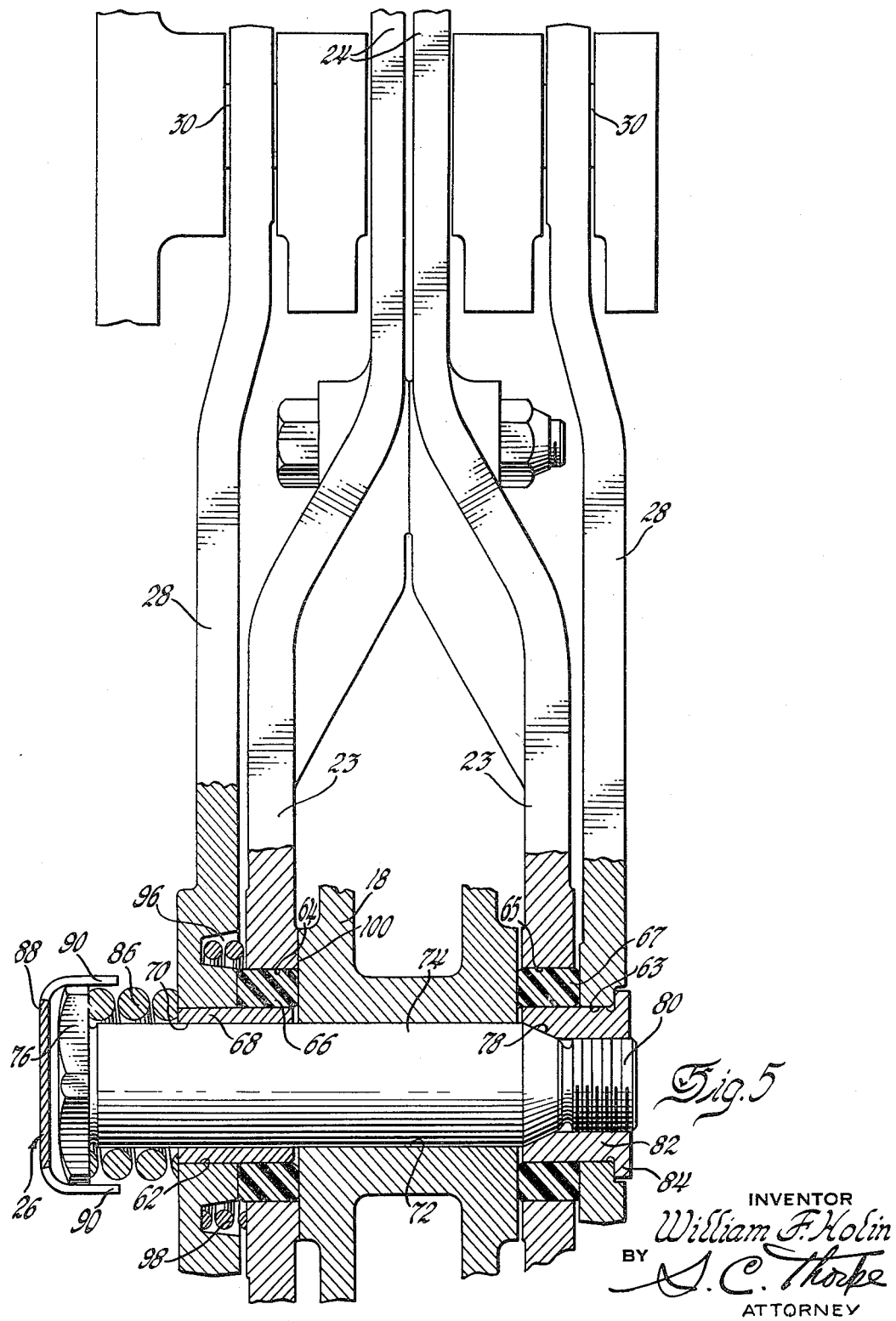

United States Patent Office 2,725,124
Patented Nov. 29, 1955

2,725,124

BRAKE RIGGING

William F. Holin, Riverside, Ill., assignor to General Motors Corporation, Detroit, Mich., a corporation of Delaware Application July 30, 1954, Serial No. 446,737

8 Claims. (Cl. 188—206)

This invention relates generally to brake rigging for railway vehicles and more particularly to clasp type brake rigging in which resilient means are incorporated in the pivotal means connecting the brake lever, the brake head and the brake hangers together.

It is an object of this invention to provide in a brake rigging preloaded resilient means which create frictional forces between the brake hangers and brake head to thereby damp movement of the hangers and head relative to each other and second resilient means which frictionally damp movement of the lever relative to the hangers and the head.

It is a further object of this invention to eliminate in a brake rigging vibration between the brake hangers and the brake head and between the brake hangers and the brake lever and the brake lever and the brake head by resilient means creating sliding frictional forces between the hangers and an intermediate bushing and the intermediate bushing and the brake head and by secondary resilient means creating frictional forces between the brake hangers and the brake lever and the brake lever and the brake head.

It is a further object of this invention to increase the service life of brake rigging of the general type by enclosing the radial bearing surface of the brake head to prevent the entry of dirt and other contaminating media thereto.

It is a still further object of this invention to provide in a steel brake rigging a bifurcated brake lever having inexpensive easily replaced phenolic bushings in bifurcations thereof extending between oppositely disposed brake hangers and engaging opposite sides of a brake head to concentrate the wear due to relative movement between the aforementioned members in the phenolic bushing.

For a further understanding of these and other related objects of this invention reference may be had to the accompanying detailed description and drawings, in which:

Fig. 3 is an enlarged view in section taken on the line 3—3 of Fig. 1 and illustrates how the brake hangers, phenolic bushings and the brake head are urged together to create frictional damping forces therebetween and further illustrates additional resilient means acting between one of the brake hangers and a bifurcation of the brake lever.

Fig. 4 is an enlarged view of the cap member which preloads the spring acting between one of the brake hangers and a flange on the pin pivotally connecting the brake hangers, the brake lever and the brake head together.

Fig. 5 is a view taken on the line 5—5 of Fig. 1 partially in section to illustrate additional details of the unique pivoting construction between the brake hangers, brake lever and brake head and also the unusual bifurcated brake lever.

Figure 1:
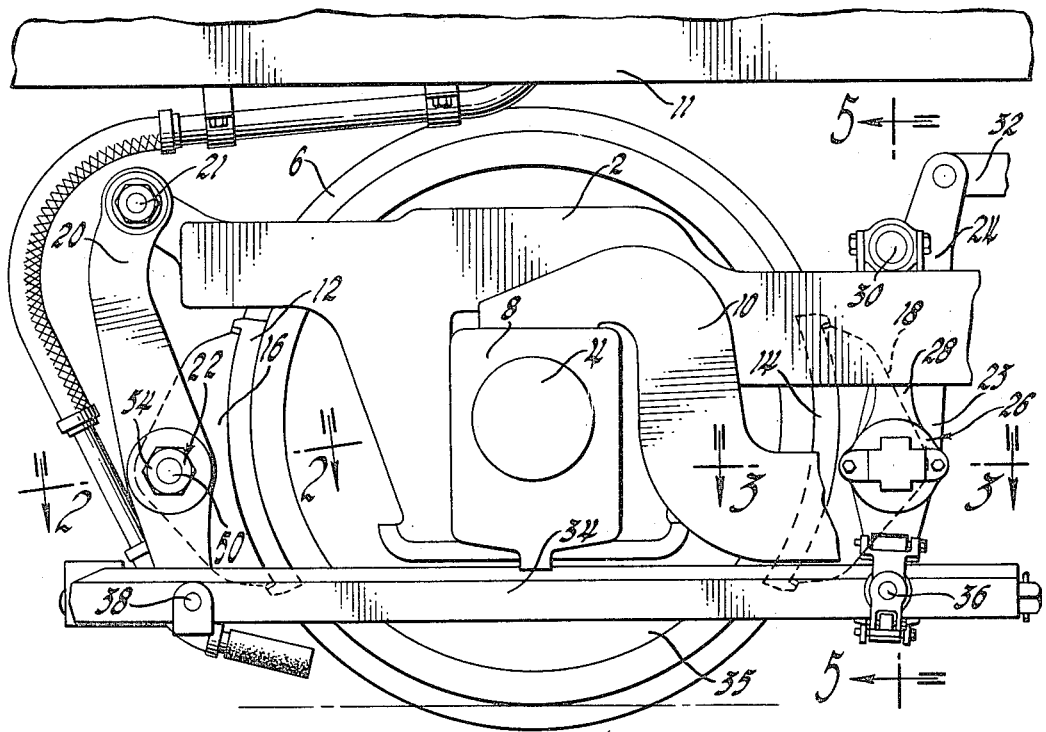
Fig. 1 is a general side view in elevation of the clasp type brake rigging in which the new construction is incorporated.

Referring now to the accompanying drawings and particularly to Fig. 1, the reference numeral 2 indicates the frame of a railway vehicle truck in which the axle 4 carrying wheels 6 is journalled in the usual manner in journal boxes 8. The reference character 10 indicates an equalizer bar, the ends of which rest on top of the journal boxes 8. The railway truck supports one end of the body 11 of a railway vehicle in the usual manner by means of a center bearing assembly (not shown) acting between the body and truck frame.

The brake rigging shown is of the clasp type and comprises brake shoes 12 and 14 adapted to be forced against the opposite sides of the wheels 6. The shoes 12 and 14 are carried on brake heads 16 and 18, respectively. The brake head 16 is pivotally mounted by means indicated generally by the numeral 22 between a pair of vertical dead brake levers 20 pivotally supported on the frame 2 at 21. The brake head 18 is pivotally mounted between outboard and inboard bifurcations 23 of vertical live brake lever 24 by means indicated generally by a numeral 26 and is pivotally supported at 26 by a pair of hangers 28 which are pivotally secured to the truck frame 2 at 30.

Operatively connected to the upper end of vertical live brake lever 24 is an operating rod 32 which is operatively connected to a brake cylinder (not shown) for actuation thereby. Connected to the lower ends of the vertical dead brake lever 20 and the vertical live brake lever 24 is a horizontal tension bar 34 comprising a single horizontally disposed bar having a longitudinally extending section located adjacent the outer face 35 of wheel 6. The horizontal tension bar 34 is pivotally attached to the lower end of the vertical live brake lever 24 at 36 and to the vertical dead brake levers 20 at point 38.

General operation of the clasp brake rigging is accomplished by movement of the operating rod 32 to the left as viewed in Fig. 1 by means of the aforementioned brake cylinder which is not shown in the drawing. This movement of operating rod 32 will cause vertical live brake lever 24 to pivot counterclockwise about point 36 until the brake shoe 14 engages the wheel 6. After the brake shoe 14 engages wheel 6 further counterclockwise pivotal movement of lever 24 will take place about the means 26 causing the horizontal tension bar 34 to move to the right as viewed in Fig. 1. Movement of horizontal tension bar 34 to the right also moves point 38 to the right and causes vertical dead brake lever 20 to pivot counterclockwise about point 21 until brake shoe 12 engages wheel 6 at which time full clasp braking of wheel 6 may be accomplished.

Figure 2:
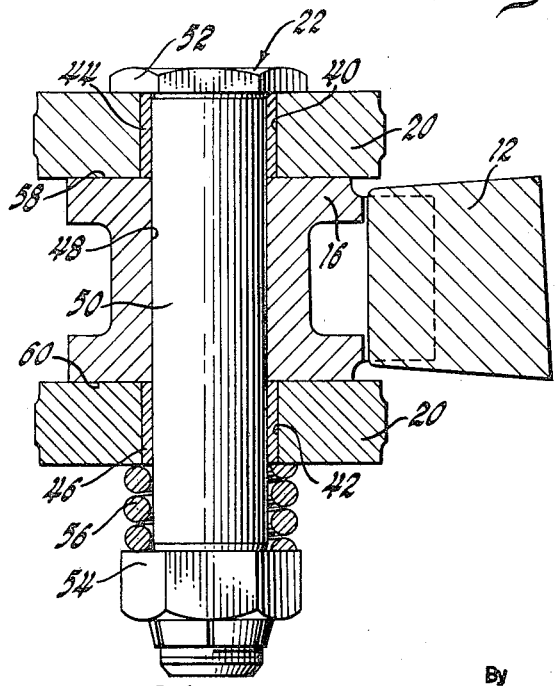
Fig. 2 is an enlarged view in section taken on the line 2—2 of Fig. 1 and illustrates how the dead brake levers are resiliently urged against wide surface areas on the brake head to stabilize the brake head, enclose the bearing surface of the brake head and damp movement of the brake head relative to the dead brake levers.

The means 22 is more particularly shown in Fig. 2 and from that figure it may be observed that the vertical dead brake levers 20 intermediate the ends thereof are provided with aligned holes 40 and 42 in which are inserted, respectively, bushings 44 and 46. Interposed between the vertical dead brake levers 20 is the brake head 16 which has suitably attached thereto the usual and aforementioned brake shoe 12. Extending through the brake head 16 is a hole defining a cylindrical bearing surface 48. Extending through the bushings 44 and 46 and through the hole in brake head 16 defining bearing surface 48 is a bolt 50 threaded at one end thereof and having a flat polygonal head 52 at the opposite end thereof. Provided on the threaded end of bolt 50 is a polygonal locking nut 54. Interposed between nut 54 and the outboard vertical brake lever 20 is a helical coil spring 56 which is loaded to create frictional forces between the vertical dead brake levers 20 and the brake head 16. It will be observed that the brake head and the vertical dead brake levers 20 are in engagement with each other over substantial flat surface areas indicated by numerals 58 and 60. This engagement between levers 20 and brake head 16 over substantial surface areas stabilizes the brake head relative to the brake levers and in combination with the spring 56, the bolt 50 and the nut 54 prevents interplay and rattling between these members which would otherwise create excessive wear and decrease the service life of the brake assembly. It will also be observed from Fig. 2 that the bearing surface 48 is completely enclosed so that no dirt or other foreign material can be deposited thereon. This enclosing of the bearing surface area 48 prevents the rapid wear which otherwise occurs when foreign matter is deposited thereon and also inceases the life of the brake rigging.

Referring now more particularly to Figs. 3, 4 and 5 it may be observed that the live brake lever 24 is split below its upper end to form a pair of bifurcations 23 which are interposed between the widely spaced brake hangers 28. Interposed between the bifurcations 23 is the brake head 18. The outboard brake hanger 28 is provided with a hole 62 in the lower end thereof which is in alignment with a similar hole 63 provided in the lower end of the inboard brake hanger 28. The outboard bifurcation 23 is provided with a hole 64 in which is located a bushing 66. The inboard bifurcation 23 is provided with a similar hole 65 in which is located a similar bushing 67. Extending through the hole 62 and the bushing 66 is a sleeve 68 having a hole 70 therein which is in alignment with a hole in the brake head 18 defining a bearing surface 72. Extending through the hole 70 and the hole defining bearing surface 72 is a bolt 74 having a polygonal flat head 76 at one end thereof and a tapered portion 78 and threads 80 at the opposite end thereof. Adapted to be inserted through the hole 63 and the bushing 67 is a nut 82 having threads therein which engage the threads 80 of bolt 74. The nut 82 is provided with a flange 84 which in combination with the flat head 76 and a helical coil spring 86 pivotally connects the brake hangers 28 and the bifurcations 23 and the brake head 18 together so that frictional forces are created between the outboard brake hanger 28 and bushing 66, between the bushing 66 and the brake head 18, between brake head 18 and the bushing 67 and between bushing 67 and the inboard brake hanger 28. It will be noted from both Figs. 3 and 5 that the bushings 66 and 67 extend completely through and slightly beyond the bifurcations 23 so that normally there would actually be some play between the bifurcations 23 and the brake hangers 28 and the bifurcations 23 and the brake head 18. This has been done for a reason to be explained in more detail later.

To prevent turning of bolt 74 relative to the hangers 28 a cap 828 with oppositely disposed ears 90 engaging flat sides of the polygonal head 76 is secured to outboard brake hanger 28 by means of studs 92 screwed to threaded holes tapped therein. To prevent loss of the studs 92 suitable wiring 94 extending through holes in the heads of studs 92 has been wound about cap 88.

It will be observed that the lower end of outboard brake hanger 28 is provided with an annular recess 96 in which resides a helical coil spring 98. The helical coil spring 98 acts between the lower end of the outboard brake hanger 28 and the outboard bifurcation 23 of brake lever 24 to create frictional forces causing damping of the relative movement between the outboard brake hanger 28 and the outboard bifurcation 23 and the outboard bifurcation 23 and the brake head 18. It should be noted that when the outboard bifurcation 23 is urged against the brake head 18 the inboard bifurcation is spaced between the brake head 18 and the inboard brake hanger 28 so that it does not engage either of these two last-mentioned members.

At this point it should be explained that while it is desirable to damp movement between the brake hangers, the brake lever and the brake head and to prevent interplay therebetween which causes wear and reduces the service life of the brake rigging, too much damping of relative movement between the brake head, the brake hangers and the brake lever will tend to eliminate movement between these members causing them to move as a unit. If too much damping movement is exerted as stated above, the lever 24 will tend to be more or less rigidly connected to the hangers 28 and, when the operating rod 32 moves to the left, these members tend to move as one so that instead of pivoting about the point 36, as is desirable, initial pivotal movement of the brake head and lever assembly tends to take place about the point 30. This initial pivotal movement about point 30 tends to initially move the brake head 18 and the shoe 14 away from the wheel causing the brake rigging to act in a manner which will initially improperly apply the shoe 14 to the wheel 6 so that excessive wear will take place at one end or the other thereof. Also, by creating large frictional forces between the brake levers and the brake head, the brake head, when it engages the wheel, does not readily adjust itself to the contour of the wheel and further excessive wear occurs.

It will be observed that by providing a relatively weak spring 98, as compared with spring 86, applicant urges the outboard bifurcation 23 against the brake head sufficiently to prevent rattling and provide proper damping but still does not prevent proper application of the shoe to the wheel. It should be appreciated that applicant by his unique construction and the utilization of phenolic bushings 66 and 67 has transferred most of the wear normally occurring between the brake hangers, brake lever and brake head to these bushings which are inexpensive and quickly replaced to thereby materially increase the service life of the more important components of the brake rigging. It should further be appreciated that applicant has provided his unique assembly with bearing surfaces for the brake heads which are completely enclosed so that dirt or other foreign material cannot be deposited thereon which would otherwise tend to shorten the life thereof.

By widely separating the brake hangers 28 and providing a bifurcated brake lever 24 which has large mutually engageable surface areas 100, applicant has increased the stability of the entire brake hanger assembly thereby preventing "fluttering" of the brake head whereby more effective braking is accomplished.

I claim:

1. In a brake rigging for a wheel of a railway vehicle truck, a brake hanger movably supported on said truck, a brake lever adjacent said hanger, a brake head adjacent said lever, bearing means extending through said lever and between said brake head and said hanger, means extending through said hanger and said bearing means and said brake head pivotally connecting said hanger, lever and brake head together, and resilient means interposed between said hanger and said lever urging said lever axially on said bearing means against said brake head whereby movement of said hanger, said brake lever and said brake head relative to each other is damped.

2. In a brake rigging for a wheel of a railway vehicle truck, a brake hanger movably supported on said truck, a brake lever adjacent said hanger, a brake head adjacent said lever, a bushing extending through said lever and between and in engagement with said hanger and said brake head, means extending through said hanger and said bushing and said brake head pivotally connecting said hanger, lever and brake head together, and resilient means interposed between said hanger and said lever urging said lever against said brake head whereby movement of said hanger, said brake lever and said brake head relative to each other is damped.

3. In a brake rigging for a wheel of a railway vehicle truck, a pair of widely spaced brake hangers pivotally supported at their upper ends on the frame of said truck, a unitary vertical brake lever having bifurcations adjacent and interposed between the lower ends of said hangers, a brake head interposed between said bifurcations, aligned bushings in said bifurcations on opposite sides of said brake head and extending between and in engagement with said brake hangers and said brake head, means extending through the lower ends of said hangers and through said bushings and said brake head pivotally connecting said hangers, bifurcations and brake head together, and resilient means interposed between one of said hangers and bifurcations urging said last-mentioned bifurcation against said brake head whereby vibration of said hangers, said lever and said brake head relative to each other is damped.

4. In a brake rigging for a wheel of a railway vehicle truck, a pair of spaced brake hangers pivotally supported at their upper ends on the frame of said truck, a vertical brake lever having bifurcations adjacent and interposed between the lower ends of said hangers, a brake head interposed between said bifurcations, aligned bushings in said bifurcations on opposite sides of said brake head and extending between and in engagement with said brake hangers and said brake head, means extending through the lower ends of said hangers and through said bushings and said brake head pivotally connecting said hangers, bifurcations and brake head together, resilient means causing said hangers and said bushings and said bushings and said brake head to frictionally engage each other to damp movement therebetween, and a second resilient means interposed between one of said hangers and bifurcations urging said last-mentioned bifurcation against said brake head whereby movement of said lever relative to said brake head is damped.

5. In a brake rigging for a wheel of a railway vehicle truck, a pair of spaced brake hangers pivotally supported at their upper ends on the frame of said truck, a vertical brake lever having bifurcations adjacent and interposed between the lower ends of said hangers, a brake head interposed between said bifurcations, aligned bushings in said bifurcations on opposite sides of said brake head and extending between and in engagement with said brake hangers and said brake head, means extending through the lower ends of said hangers and through said bushings and said brake head pivotally connecting said hangers and said bushings and said brake head together, resilient means urging said hangers and said bushings and said bushings and said brake head into frictional engagement with each other, other resilient means interposed between one of said hangers and bifurcations urging said last-mentioned bifurcation against said brake head whereby vibration of said brake lever relative to said brake hangers and said brake head is damped, said last-mentioned resilient means exerting a lesser force than said first-mentioned resilient means.

6. In a brake rigging for a wheel of a railway vehicle truck a steel brake hanger movably supported on said truck, a steel brake lever adjacent said hanger, a steel brake head adjacent said lever, a bushing of phenolic material extending through said lever between and in engagement with said hanger and said brake head, means extending through said hanger and said bushing and said brake head pivotally connecting said hanger, lever and brake head together, and resilient means interposed between said hanger and said lever urging said lever against said brake head whereby movement of said hanger, said brake lever and said brake head relative to each other is damped and direct contact between said brake hanger and said lever is prevented.

7. In a brake rigging for a wheel of a railway vehicle truck, a pair of widely spaced brake hangers pivotally supported at their upper ends in the frame of said truck, a vertical brake lever having bifurcations adjacent and interposed between the lower ends of said hangers, a brake head interposed between said bifurcations and having a bearing opening therein, bushings in said bifurcations in alignment with said bearing opening, said bushings extending between and being in engagement with radially extending surfaces of said brake hangers and said brake head, a pin assembly including sleeves at opposite ends thereof each extending through a brake hanger and one of said bushings and a pin extending through holes in the lower ends of said hangers and through said bushings and said bearing opening and pivotally connecting said hangers, bifurcations and brake head together whereby the surface forming said bearing opening is completely enclosed.

8. In a brake rigging for a wheel of a railway vehicle truck, a brake hanger member movably supported on said truck, a brake lever member adjacent said hanger member, a brake head member adjacent said lever member, means extending through said members pivotally connecting said members together, and resilient means interposed between two of said members urging two of said members together on said means pivotally connecting said members together whereby movement of said members relative to each other is damped.

References Cited in the file of this patent
UNITED STATES PATENTS
2,571,410     Blomberg _____ Oct. 16, 1951